Patented Mar. 11, 1941

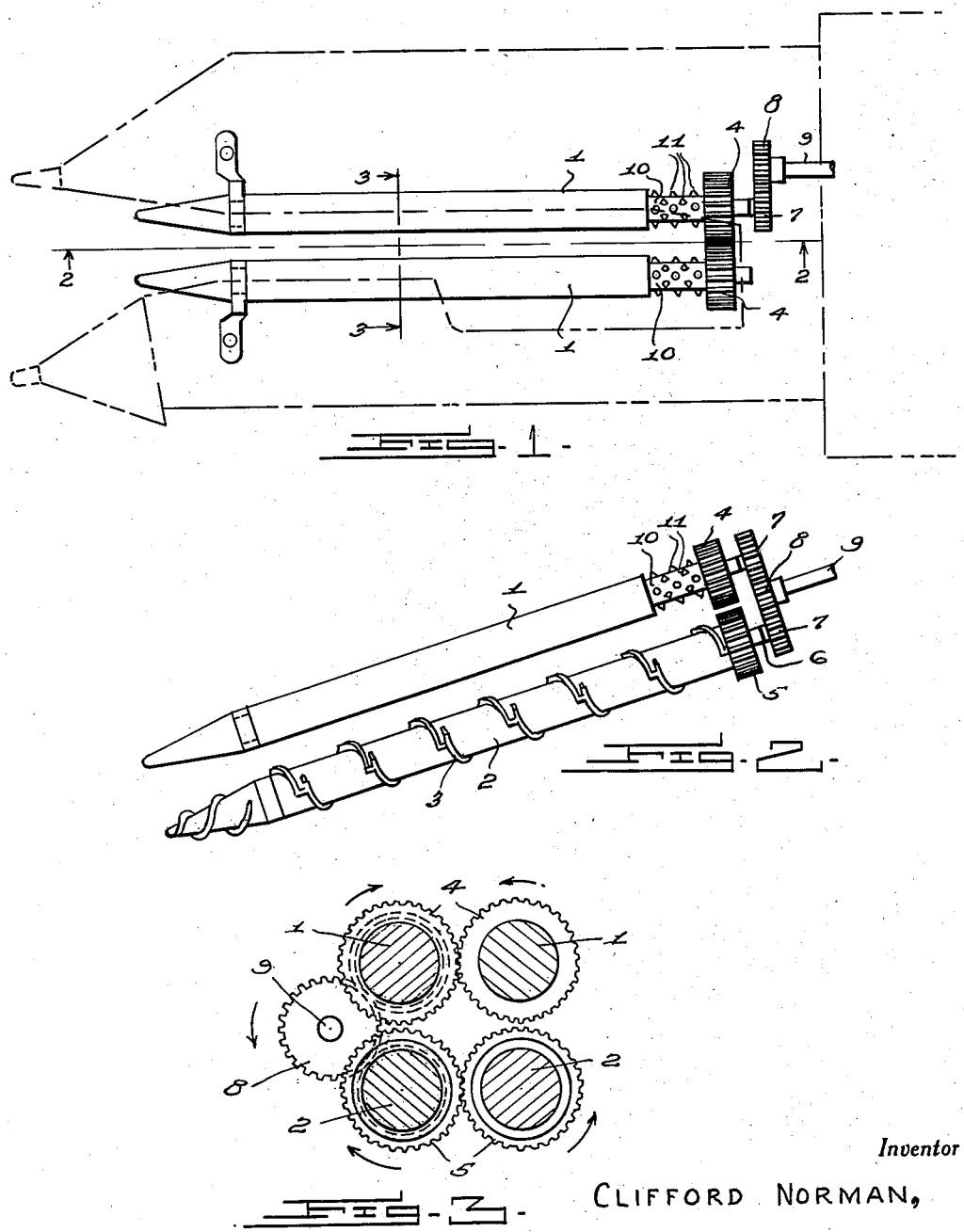

2,234,447

UNITED STATES PATENT OFFICE 2,234,447

ROLL ARRANGEMENT FOR CORN PICKERS

Clifford Norman, Paton, Iowa, assignor to Deere & Company, Moline, Ill., a corporation of Illinois Application October 24, 1939, Serial No. 301,060

4 Claims. (Cl. 130—5)

This invention relates to a roll arrangement for corn pickers, the general object of the invention being to provide an arrangement of rolls which will pick the ears of corn from the stalks without shelling the kernels from the cob.

Another object of the invention is to provide some of the rolls with means for preventing waste material from reaching the gears of the roll assembly.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which—

Figure 1 is a top plan view of the improved roll arrangement with parts of the picking machine shown in dotted lines.

Figure 2 is a section on the line 2—2 of Figure 1.

Figure 3 is a section on the line 3—3 of Figure 1.

As shown in these views I provide an upper pair of smooth picking rolls 1 and a lower part of the ribbed rolls 2, these lower rolls being provided with the spiral ribs 3 of the usual or any desired construction. The upper pair of rolls 1 are geared together by the gears 4 and the lower pair by the gears 5. One of the upper rolls 1 and one of the lower rolls 2 are each formed with an extension 6 on its upper end to which is attached a spur gear 7 and these gears are meshed by a spur gear 8 on a drive 9 which is driven from any suitable part of the machine. The four rolls slope forwardly and downwardly as usual and are supported for rotary movement and the front ends are tapered.

The upper smooth rolls 1 are provided with rear reduced parts 10 which are provided with small projections 11 and these projections act to throw off any waste material that has moved upwardly on the smooth rolls so that these projections or lugs clean the rolls and prevent the material from getting caught in the gears.

This arrangement of rolls will remove the ears of corn from the stalks without shelling the corn.

The ribbed or rough rolls 2 engage the corn stalks and pull the stalks through the smooth rolls which snap the ears from the stalks without shelling any corn.

It is thought from the foregoing description that the advantages and novel features of the invention will be readily apparent.

It is to be understood that changes may be made in the construction and in the combination and arrangement of the several parts without departing from the scope of my invention, provided that such changes fall within the scope of the appended claims.

Having described the invention, what is claimed as new is:

1. In a corn picking machine, a pair of smooth upper rolls, a pair of rough lower rolls, means for driving all four rolls in a direction to pull a corn stalk between the rolls of the pairs downwardly, with the lower pair of rough rolls pulling the stalks through the smooth upper rolls and said smooth rolls snapping the ears from the stalks.

2. In a corn picking machine, a pair of smooth upper rolls, a pair of rough lower rolls, the rough rolls pulling the stalks through the smooth rolls which remove the ears from the stalks, and means for driving all four rolls, said means including gears for connecting together the rolls of each pair and a single drive shaft and gears connecting an upper roll and a lower roll to said drive shaft.

3. In a corn picking machine, a pair of smooth upper rolls, a pair of rough lower rolls, the rough rolls pulling the stalks through the smooth rolls which remove the ears from the stalks, and means for driving all four rolls, said means including gears on the upper ends of the rolls with the gears of the rolls of each pair meshing with each other, each smooth roll having a reduced upper portion which extends from the major portion of the roll to the gear and a plurality of radiating and pointed projections on the reduced part and spaced apart, said projections engaging materials moving up the rolls and preventing such material from reaching the gears.

4. In a corn picker, a pair of rolls rotatably mounted in a position to receive corn stalks therebetween, said rolls having suitable projections adapted to aggressively grip the stalks and pull them therethrough, a second pair of rolls disposed adjacent said aggressive rolls in a position to receive said stalks as they are being pulled by the latter, to intercept ears of corn on said stalks and snap said ears from the stalks before the ears are engaged by said aggressive rolls, thus preventing the ears from being shelled by the latter, said second pair of rolls having a comparatively smooth surface adapted to snap said ears without shelling the same, and means for rotating all of said rolls.

CLIFFORD NORMAN.